US007094150B2

(12) United States Patent
Ungaro et al.

(10) Patent No.: US 7,094,150 B2
(45) **Date of Patent: *Aug. 22, 2006**

(54) PRO-AGGRESSIVE ROULETTE

(75) Inventors: Mark Curran Ungaro, 2144 Tona Cir., Las Vegas, NV (US) 89109; Carlo Palombo, Las Vegas, NV (US)

(73) Assignee: Mark Curran Ungaro, Las Vegas, NV (US)

(*) Notice: Subject to any disclaimer, the term of this patent is extended or adjusted under 35 U.S.C. 154(b) by 351 days.

This patent is subject to a terminal disclaimer.

(21) Appl. No.: 10/642,019

(22) Filed: Aug. 18, 2003

(65) Prior Publication Data

US 2004/0072609 A1 Apr. 15, 2004

Related U.S. Application Data

(63) Continuation-in-part of application No. 09/799,889, filed on Mar. 3, 2001, now Pat. No. 6,776,714.

(51) Int. Cl.
*A63F 13/00* (2006.01)
*A63F 9/24* (2006.01)
*G06F 17/00* (2006.01)
*G06F 19/00* (2006.01)

(52) U.S. Cl. ........................... 463/27; 463/16; 463/17; 463/25; 463/26; 463/27; 273/274; 273/283; 273/309

(58) Field of Classification Search .................... 463/1, 463/10–13, 16–31, 43, 46; 273/274, 236, 273/237, 283, 268, 148 B, 309, 148 R, 142 E–142 G
See application file for complete search history.

(56) References Cited

U.S. PATENT DOCUMENTS

| | | | | | |
|---|---|---|---|---|---|
| 4,396,193 | A | * | 8/1983 | Reinhardt et al. | 463/22 |
| 4,906,005 | A | * | 3/1990 | Manabe | 463/22 |
| 5,042,810 | A | * | 8/1991 | Williams | 463/17 |
| 5,540,442 | A | * | 7/1996 | Orselli et al. | 463/17 |
| 5,588,650 | A | * | 12/1996 | Eman et al. | 273/142 B |
| 5,770,533 | A | * | 6/1998 | Franchi | 463/42 |
| 5,775,993 | A | * | 7/1998 | Fentz et al. | 463/17 |
| 5,857,909 | A | * | 1/1999 | Rubin | 463/17 |
| 6,059,659 | A | * | 5/2000 | Busch et al. | 463/17 |
| 6,283,856 | B1 | * | 9/2001 | Mothwurf | 463/17 |
| 6,575,834 | B1 | * | 6/2003 | Lindo | 463/40 |
| 6,659,866 | B1 | * | 12/2003 | Frost et al. | 463/17 |
| 6,776,714 | B1 | * | 8/2004 | Ungaro et al. | 463/27 |

* cited by examiner

*Primary Examiner*—Xuan M. Thai
*Assistant Examiner*—Binh-An D. Nguyen

(57) ABSTRACT

An improved roulette game utilizing he existing roulette wheel and/or electronic LED wheel with an existing layout to enhance the game or roulette. Players make wagers on the conventional layout and using the plurality of token or chip acceptors as an extra wager to win either a major progressive jackpot or minor progressive jackpot.

6 Claims, 23 Drawing Sheets

PROGRESSIVE ROULETTE DEALER STATION OPERATING INSTRUCTIONS

| FUNCTION KEY | DURING REGULAR GAME |
|---|---|
| LOCK IN BETS | Will drop the tokens placed and record bets on each player station. |
| CHIP | Will start the conveyer manually in order to retract chips in case of a dispute. |
| CANCEL | Will clear the screen on the dealer station. Not necessary to enter new number |
| ENTER | Enters the number displayed on the screen to make it an official result of last spin. |
| **FUNCTION KEY** | **DURING MANAGEMENT MODE** |
| LOCK IN BETS | Functions ONLY when jackpot seeds or progressive rate are displayed on the dealer station. By pressing the button, you can change such settings in the system.<br>CAUTION: Such changes require gaming board confirmation.<br>To activate these functions, you should first insert the manager key, then press a number (see list below) and 'Enter'. The associated function will display:<br>17- Major jackpot seeds 18-Minor jackpot seeds<br>19- Major progressive rate 20-Minor progressive rate |
| CHIP | Will reset the jackpot amount after payoff according to the seed.<br>When pressed when no jackpot has be hit, the system will indicate so on the display. |
| CANCEL | Will void the last number entered by mistake. The system will then prompt for the new (correct) number to be entered.<br>NOTE: The system will only allow to erase one last number. Further attempt will be ignored. |
| ENTER | Will bring up the accounting function and set game returns.<br>The game is designed to handle 16 player stations. When a station number(1 - 16) and then the 'Enter' key is pressed, it will display the token dropped from that station. When number ' 0 ' is showing before 'Enter', it will display the total token taken by the table.<br>When press '17' and 'Enter', the system will display major jackpot seeds.<br>When press '18' and 'Enter', the system will display minor jackpot seeds.<br>When press '19' and 'Enter', the system will display major jackpot progressive rate.<br>When press '20' and 'Enter', the system will display minor jackpot progressive rate. |

FIG 13

PRO-AGGRESSIVE ROULETTE

This application is a continuation-in-part of U.S. application Ser. No. 09/799,889 filed Mar. 3, 2001, now U.S. Pat. No. 6,776,714.

BACKGROUND

The present invention relates to casino table gaming, and more specifically pertains to a system for playing a roulette game including two pro-aggressive jackpots a major jackpot and a minor jackpot. Roulette, one of the oldest games in the history of gambling utilizes an at odds payout system coupled with an existing wheel and numbered layout corresponding to the roulette wheel that is standard to the industry During the course of play, the players place their wagers (chips or tokens) on the betting layout located on the roulette table. The croupier or dealer (hereafter referred to as a dealer) spins the wheel to place the game in motion. At the same time the dealer spins the ball in the opposite direction. As the ball slows, it hits the frets located in the wheel head and then lands into a number that is associated with the table layout numbers. The dealer then settles the various wagers in accordance with the payouts, odds and predetermined rules.

In theory, the game should include more than the standard betting opportunity during the course of the game. Enhancing the play with Pro-Aggressive Jackpots would excite the player's interest and enjoyment with the option or winning a larger payout and involve them with more participation in the game of standard Roulette.

The Progressive Jackpot betting is known for casino wagering play. U.S. Pat. No. 4,861,041 (Jones et al.) and U.S. Pat. No. 5,288,081 (Breeding) disclose methods for progressive jackpot gaming. Respectfully, both patents disclose that at the beginning of a hand dealt with cards, the player may make an additional wager. The acceptor starts the progressive betting as it would in a standard slot machine.

U.S. Pat. No. 5,042,810 issued to Martin G. Williams on Aug. 27, 1991 discloses a method and apparatus for playing a roulette game including a progressive jackpot. The apparatus includes a computer that is programmed to detect the occurrence in a game situation in which a payout of two separate jackpots could occur. A chip counter and sorter count the wagers placed on the roulette-like table layout and increments the two separate amounts based upon percentages of the layout wager amounts. If you will notice, the first jackpot is paid when the same number occurs or comes up three times in a row. The jackpot is then paid to the player who is playing with the color next to which that number is assigned to or to be paid. The first jackpot is paid when the same number occurs 3 times in a row, and is paid to the player who is playing with the color, which that number is permanently assigned or allocated. I.E. red=1, 6, 14 and 18; blue 2, 7, 15, 19; yellow=3, 89, 20, 30 etc. His second jackpot then immediately becomes available to be won and is won if the same number occurs on the next spin. If no one is playing the color when the numbers occurs, the jackpot is not won and the amount continues to be incremented. Because the chips are different colors, each player can only bet on a portion of the jackpot or game in order to win the progressive jackpot.

U.S. Pat. No. 5,743,789 issued to Terry Allen Adams et. al. and assigned to Progressive Games Inc. of Ft. Lauderdale Fla. discloses an apparatus for playing a roulette game including a progressive jackpot. Each player is assigned a token or chip color at his or her position on the table. The player places the wager on the layout on the appropriate number indicia. A control system including an optical sensor head for detecting the speed and position of the ball in the roulette wheel as well as the number or revolutions of the wheel is used to display the winning number on a electronic sign. Then, after four different spins of the roulette wheel, and if the ball lands in the same pocket (or compartment) on the roulette wheel indicating the same number four spins in a row, the player would win the progressive jackpot. The color and position of the player determines who wins the progressive jackpot. The progressive jackpot even at present can only be won by catching the same winning number four times in a row.

U.S. Pat. No. 6,059,659 issued to Steven L. Bush et. al. and assigned to Las Vegas Gaming Inc. discloses a method using a roulette like table layout with added betting features for the progressive jackpot. In the various embodiments of the invention, bets may be placed on either the conventional roulette layout or the progressive betting layout. The two layouts are incorporated into the same betting surface on the existing table. It is preferred that the players be required to first wager in the conventional portion of the layout before wagering on the progressive phase of the layout or game. The player has the option of handing the dealer a chip or token and verbally indicating to the dealer to place the chip or token on the selected number on the progressive jackpot betting portion of the game. If the next spin of the wheel results in the wheel selecting the same progressive jackpot number as it did in the previous spin, a fixed cash payout may optionally be awarded to the player who bet on the number. The players have a choice in the progressive jackpot betting portion on the table layout. To win the progressive jackpot, the player still must wager a complicated jackpot layout and roulette game scheme.

U.S. Pat. No. ______ Issued to Reinhardt et. al. discloses a roulette game modified by electronic circuitry including a microprocessor that that determines which one set of numbered compartments, red or black receives a ball and displays the results via a lighted and marked roulette table. A microprocessor and sensors are used to receive information on which compartment received the ball. The device calculates the winning wagers and lights the corresponding spaces or indicia of the roulette table and informs the player of the results.

SUMMARY OF THE INVENTION

The present invention provides an improved method and apparatus for playing the game of roulette including two different Pro-Aggressive Jackpot payouts. Playing the game of Pro-Aggressive Roulette™ is very simple. The apparatus or device requires minimum change to the roulette table not the layout. There is no change to the game of roulette. The game of roulette is still played the same, dealt the same, supervised and monitored in the same fashion. The Pro-Aggressive portion of the game using the standard roulette wheel or electronic LED wheel, coin gate acceptor, dealer control panel and sigh display, will allow the player to wager and win one of the Pro-Aggressive Jackpots. By using the electronic wheel, there is no need to balance the wheel after placing it on the table in the casino. If the roulette table is to be used on the high seas on a cruise ship for example, the electronic wheel can move with the ship. The ball will not favor one side of the wheel or the other. It also eliminates the need for the dealer to reach into the bowl of the wheel with his hand. Another problem encountered is the dealer. A good dealer that is dishonest can spin the wheel and ball and make the ball land with in one or two numbers of the desired result if not the particular intended number. If the dealer is working with outside help of a perfidious player, the house is capable of losing large amounts of money. The electronic wheel portion of the invention would eliminate the dilemma. The dealer would no longer be required to spin the ball and wheel. He would simply press a button and the action would start. Using the electronic wheel would increase revenue for the house because they would receive more spins and decisions per hour. The choice is up to the house or management.

In brief, the focus of the pro-aggressive portion of the game relies upon the player's achieving three numbers in a row or three in a line consecutively for the small or minor jackpot. The three numbers in a line or row must abut vertically, horizontally or diagonally to win. To win the major pro-aggressive jackpot the player must catch the numbers 2, 0 and 00 in any order just as long as they come up one after the other consecutively. On a single 0 roulette game layout or (European French Layout) the numbers would be 1, 3 and 0 only to win the same major pro-aggressive jackpot. The invention is to provide a simple and precise addition to the roulette game and add more excitement for the player. The apparatus is made up of six or seven (depending on the management) specially designed player stations using a P87C51 programmable chip, one dealer control panel with key pad, an electronic roulette wheel designed using five timed generators coupled together and then coupled to the micro controller and sign depicting the two jackpot amounts. Built into the table itself is an industry standard conveyor system to return the tokens or chips to the dealer and a specially designed micro controller using a P89C660 HBA programmable chip. The jackpot fund is accumulated solely from wagers made on the pro-aggressive portion of the game not the betting layout. The roulette game itself, can either be played with a standard roulette wheel or an electronic roulette wheel. The end result or outcome will always be the same for the player. Using the standard roulette wheel, the dealer will manually enter the winning number or result when the ball falls into the slot or depression in the wheel head. Using the electronic roulette wheel the result will be automatic.

For example, if the first number that the player generated on the first spin of the wheel was a 7, The micro controller is programmed with a look-up table selecting all the numbers associated with the number 7, In that particular table, the numbers are 1,4,10,13,5,3,8,9,11 and displayed on the LCD display located in front of the player at his station and the first number of the segmented display will light the number 7. If the second spin of the wheel is 5, then the micro controller is only looking for one number in the second look-up table. And that number would be 3, So, if the first and second numbers are 7 and 5, respectfiully, they would appear on the segmented display on the LCD screen in front of the player. If the third result or spin is a 3, the player would win the minor pro-aggressive jackpot. At that time, music would play. The LCD screen will display a winner and the amount that is won by the player. Should there be more than one player, and they are all on the same winning three numbers in arrow or three in a line, the players will all share in the amount of the minor pro-aggressive jackpot that is divided evenly and automatically by the micro controller. The major pro-aggressive jackpot is played in the same fashion. The player or players must collect the numbers 2, 0, and 00 only to win. The odds of hitting the major pro-aggressive jackpot are quite a bit more, so the odds payout is greater for the player or players. The player does not have to play the pro-aggressive part of the roulette table if they desire not to do so. It does not affect the game of standard roulette.

BRIEF DESCRIPTION OF DRAWINGS

FIG. 13 depicts the operating instructions on the pro-aggressive system.

DESCRIPTION OF THE SPECIFIC EMBODIMENT

Figure 1:
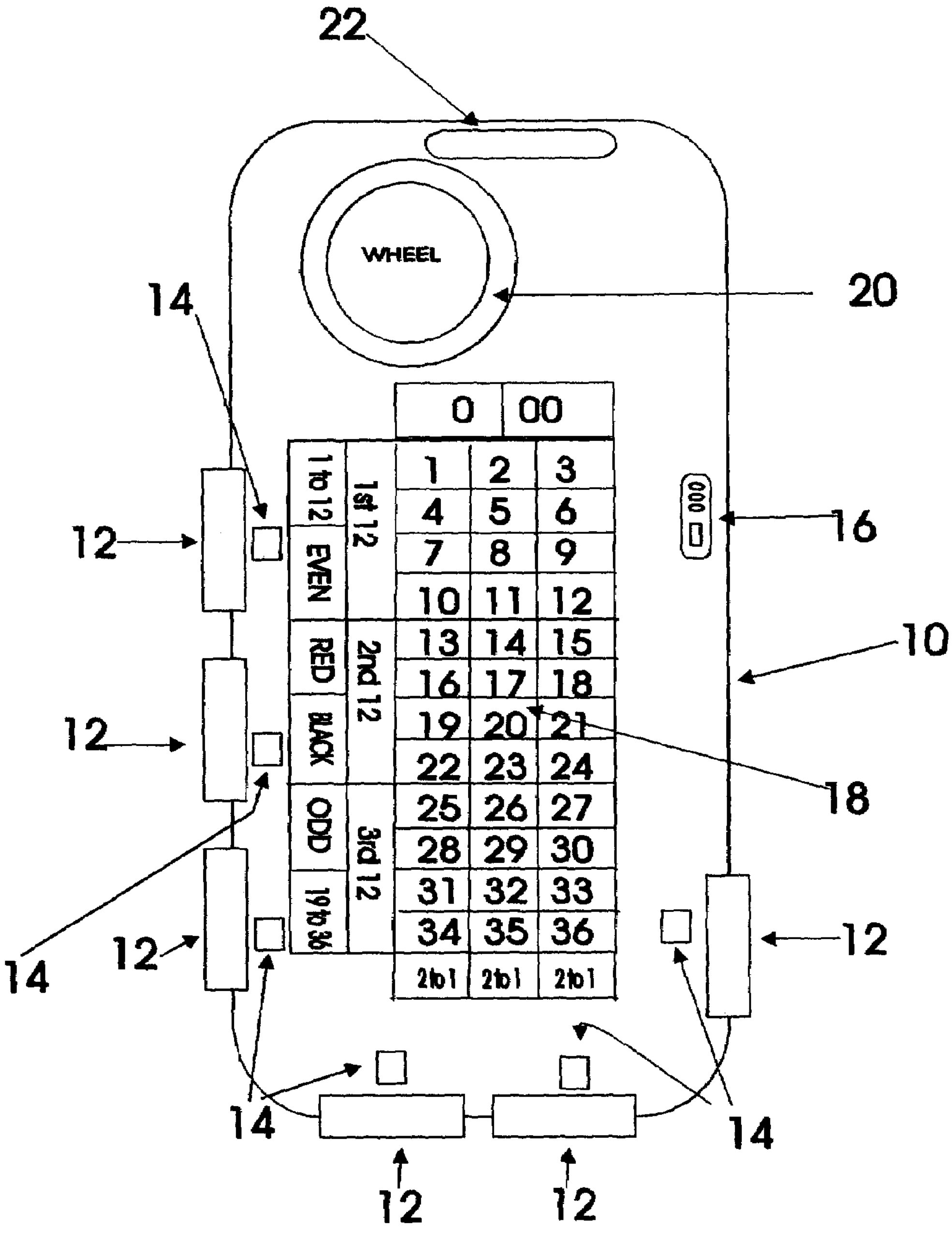
FIG. 1 is a top view of a roulette table incorporating the pro-aggressive betting system with the electronic wheel and sign display.

Illustrated in FIG. 1 is a typical roulette table 10, depicting the player cushions and positions 12, the manual roulette wheel 20, sign 22, dealer station 16, conventional roulette layout 18, and the pro-aggressive jackpot player stations 14. The table 10 is mounted to a base structure 72. In accordance of the present invention, the player, would sit at one of the player positions 12, and play the game of roulette using the standard practices of betting and wagering. Currently, the player station 14, located directly in front of the player displays the first indicator light 74 that it is ready to accept a token for the pro-aggressive wager. The player at his or her discretion can play the pro-aggressive jackpot by placing a token 68 into the player station coin gate acceptor 36. The dealer, before manually spinning the wheel and ball will check to see if all players have placed their wagers in the slot

36. The light emitting diode 38 and infrared phototransistor 92 (devices that are commercially available) will indicate to the dealer by emitting a ready light 76 that a token has been placed in slot 36. The dealer will accept the token wagers 68 by pressing the accept bets button 44 at his control panel 16. Next, the coin gate servomotor 64 and servo arm 70 will release the token so that it may pass through the second light emitting diode 38 and infrared phototransistor 92 activating the accepted light 78 setting the pro-aggressive portion of the game in motion and activating the conveyor system 58 returning the token back to the dealer position to re-introduce it to the table 10 for continued play. The micro controller 90, will automatically subtract a percentage of the amount accepted in or dropped and add it to the pro-aggressive sign 22 display for both the minor and major jackpots. The controller 90 will add a percentage to the minor jackpot 52 and a percentage to the major jackpot 54. The percentage can be calculated from 1% to 99% in the controller 90. It is strictly up to the house on how much needs to go to the jackpots to enhance player action. Both jackpots can be seeded to start at a certain amount if desired.

Figure 2:
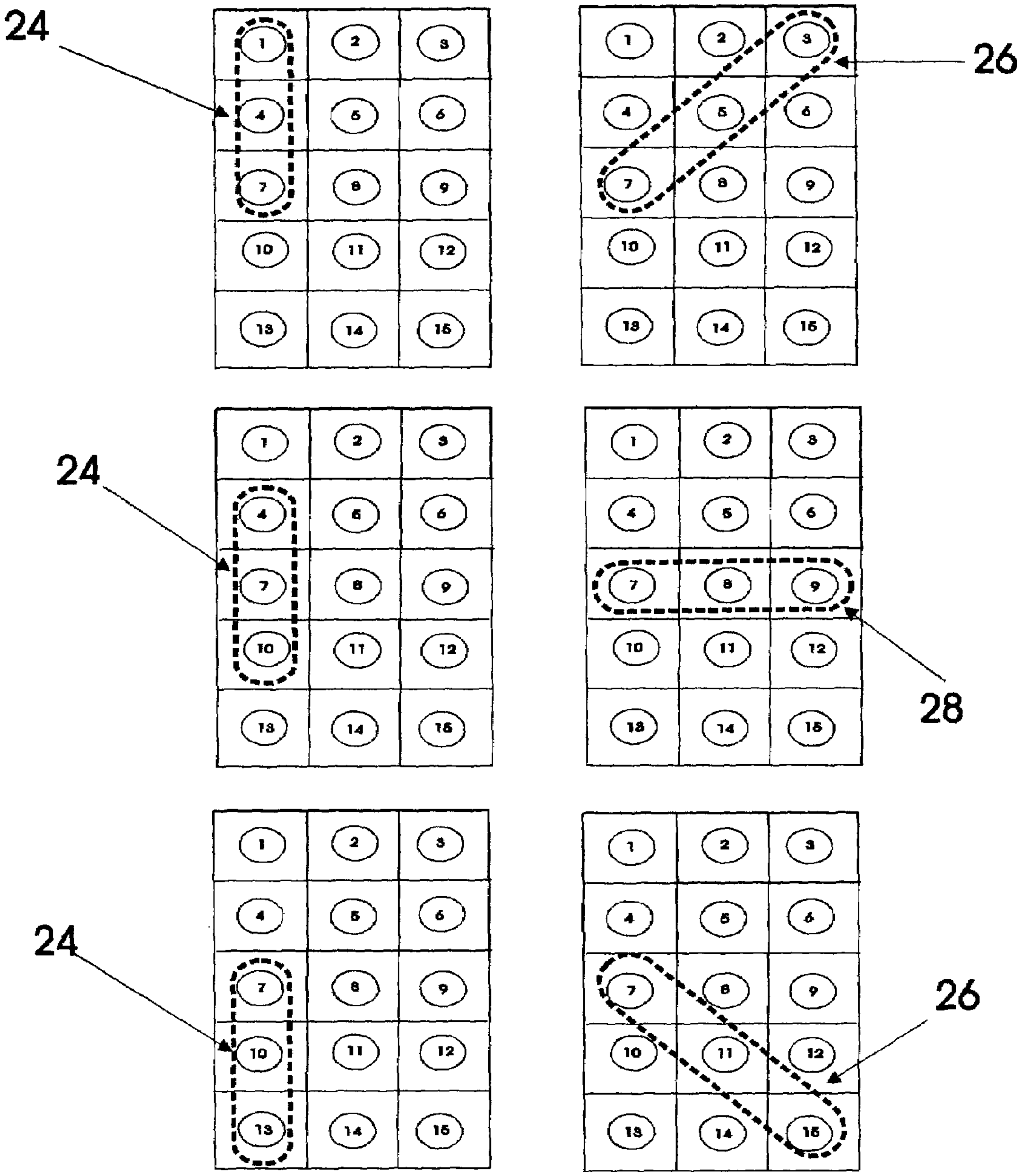
FIG. 2 is a portion of the roulette layout depicting the different ways to catch three consecutive numbers in a row or three numbers abutting each other to win the minor pro-aggressive jackpot.

The dealer spins the wheel 20 and after the ball slows and falls into a number slot, (7) for instance, that number is manually entered into the dealer station control panel 16 key pad 40, using the enter button 50. The number being the first number in a row or line for the player is displayed in front of the player at his or her station 14 via a segmented display 32. The controller 90 is automatically looking for the surrounding numbers associated with the first number in its data bank look up table as depicted in FIG. 2, 26. Meanwhile, other players are betting regular roulette and not betting the pro-aggressive portion of the roulette game because it does not affect the regular game of roulette. Pro-Aggressive Roulette™ is strictly a side betting option of the regular game of roulette. The player can play the second coin or token to achieve his or her second number. The player simply inserts a second wager in the coin gate acceptor slot 36. Again, the dealer accepts the bets using his control panel button 44, and the control panel 16 reactivates the process over again. The dealer manually spins the wheel for another decision and the second number this time is (3). The dealer enters the second number using the key pad 40 and enter button 50. The second number is automatically displayed at the player station via the segmented display 32. Referring to FIG. 2, 26, the only number needed to win the minor pro-aggressive jackpot is (5). On the third spin, if the number (5) does come up, the player wins the minor jackpot 52.

After the first number is entered, the micro controller 90 is programmed with a look-up table looking for the second number associated with the first number. The table can have anywhere from three to ten numbers for the second result. The third number look-up table can have anywhere from one to two numbers for the final result.

Figure 3:
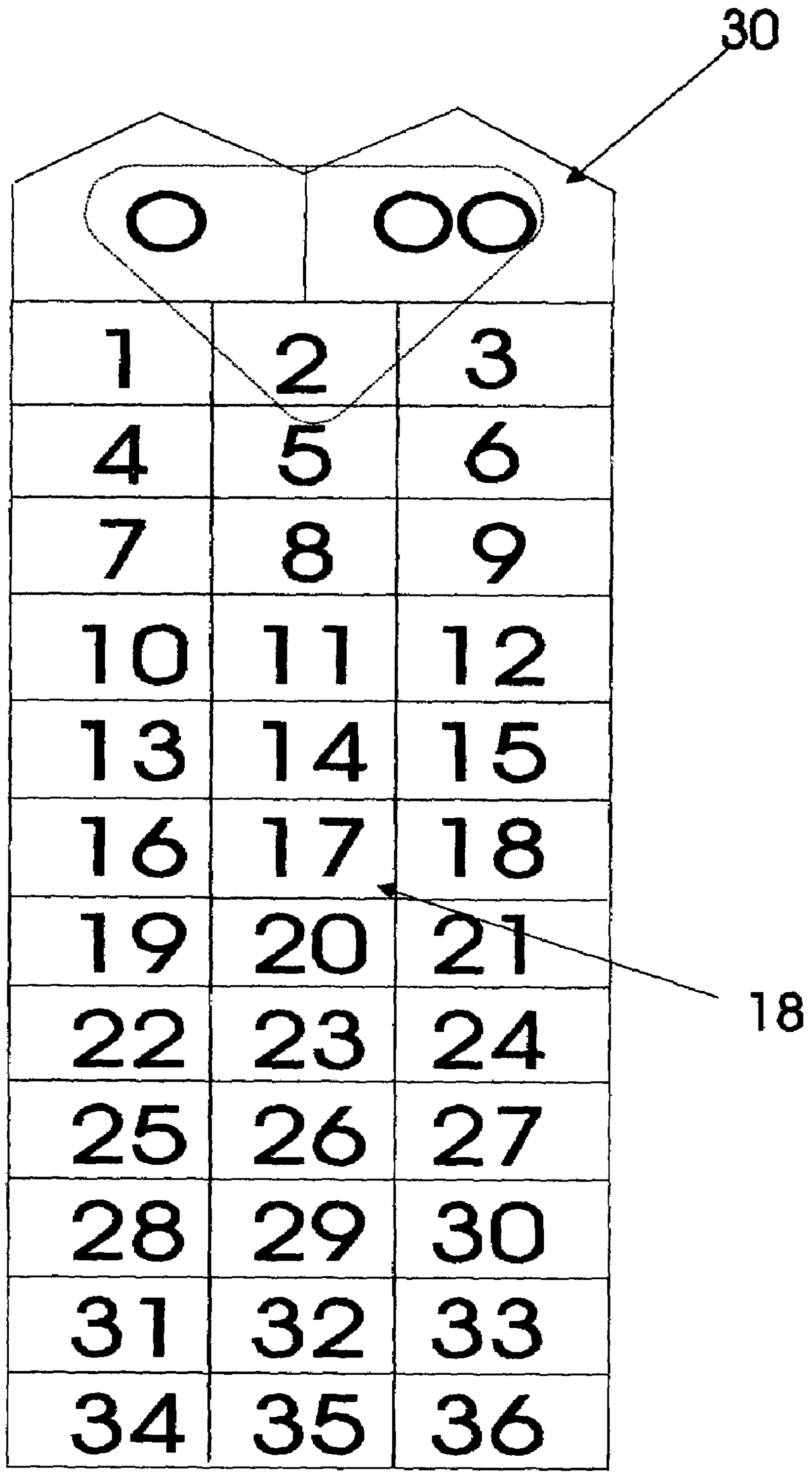
FIG. 3 is a top view of the 0, 2 and double 00 roulette layout depicting the only way to catch the major pro-aggressive jackpot using the 0, 2 and 00 configuration.
Figure 4:
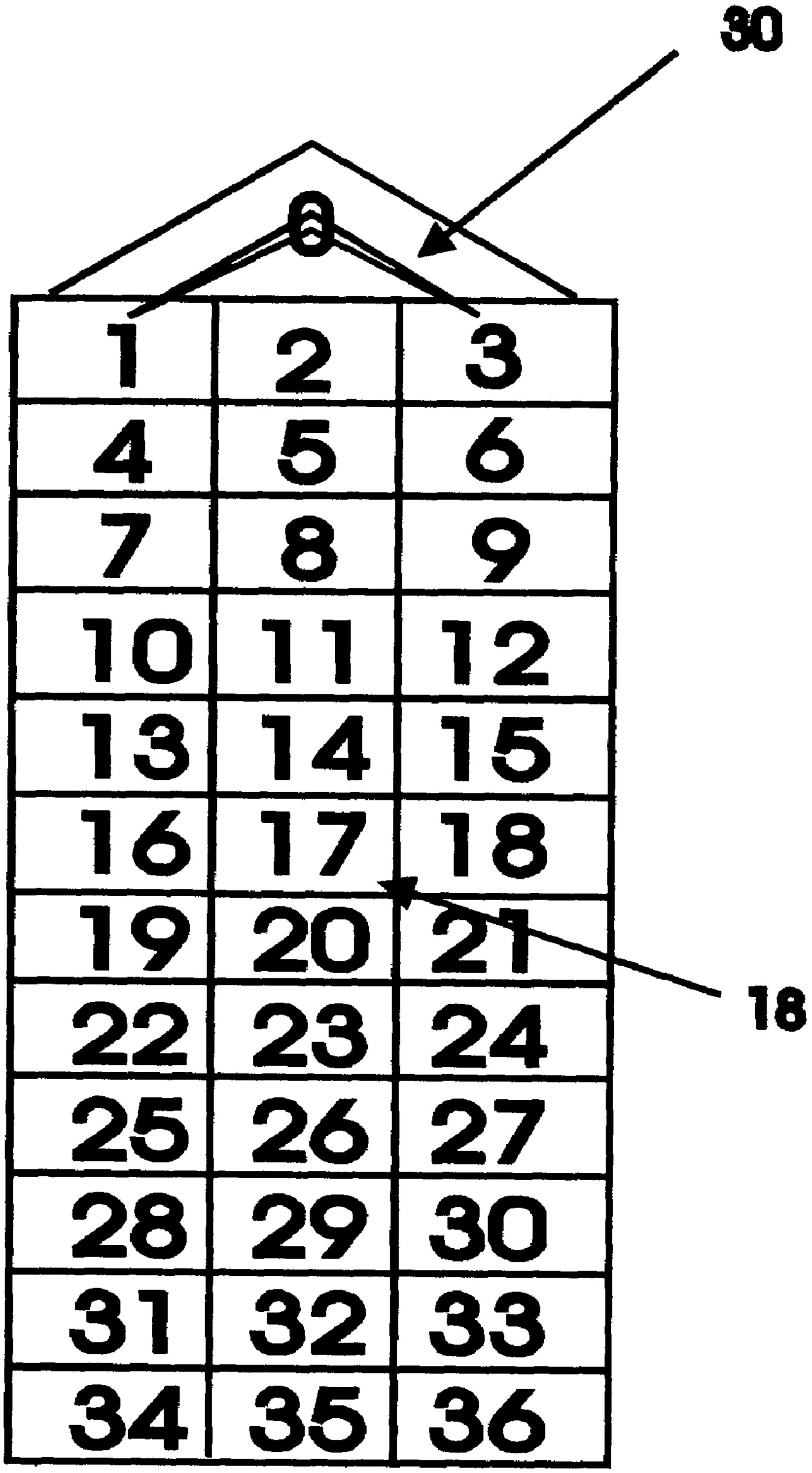
FIG. 4 is a top view of the single 0 or French roulette layout depicting the major pro-aggressive jackpot using the numbers 0, 1 and 3.
Figure 5:
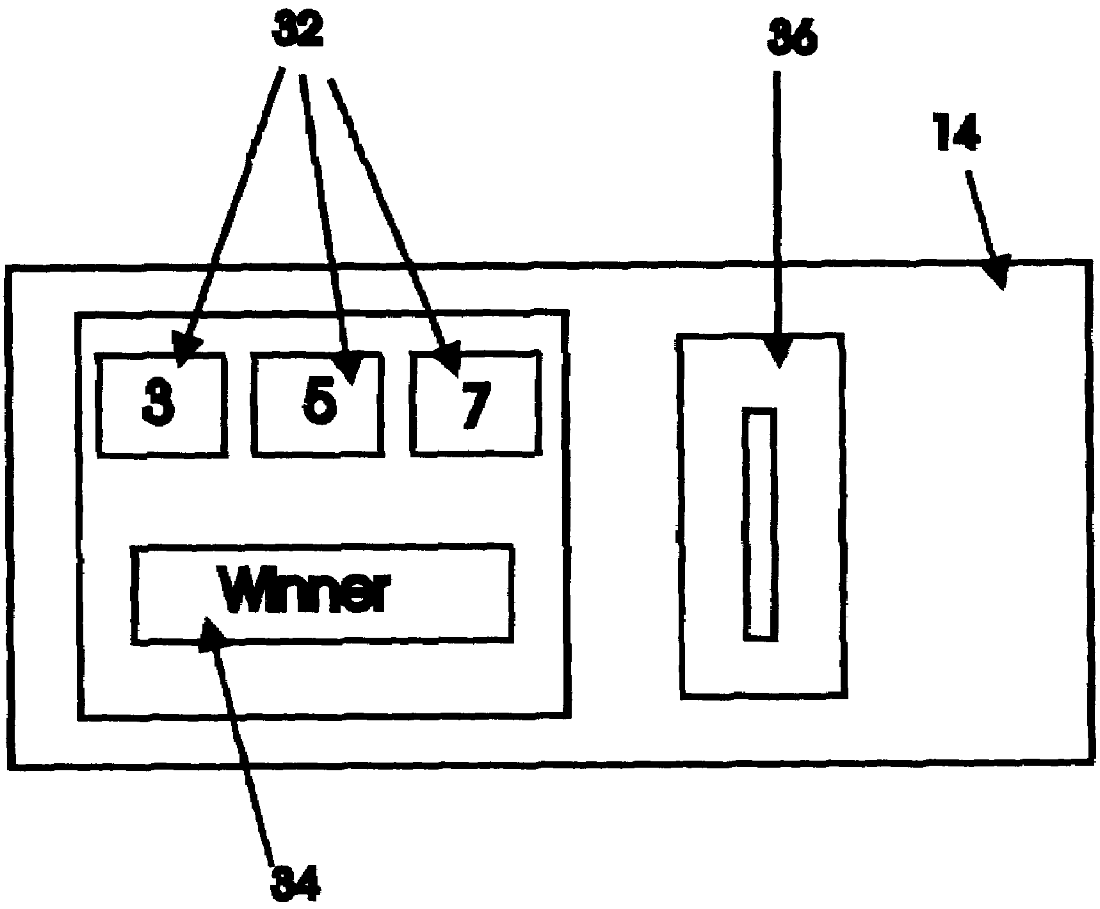
FIG. 5 is a top view of a typical player station with a coin gate slot, LCD display and segmented display for the three consecutive numbers in a row or line.
Figure 6:
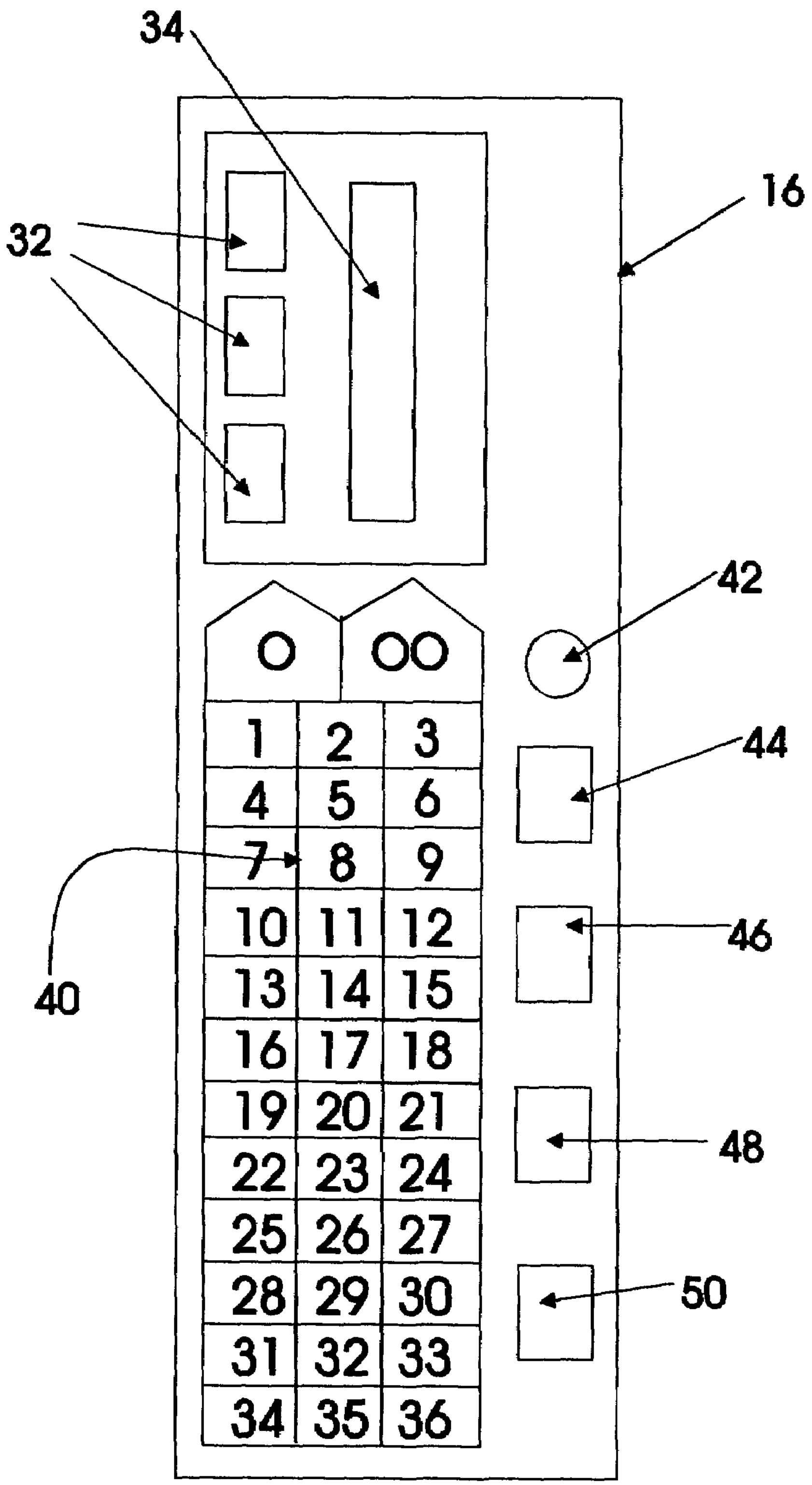
FIG. 6 is a top view of the dealer control panel depicting the key pad number entry, LCD and segmented lights display for the dealer, accept bets, cancel, enter and chips return override buttons.
Figure 7:
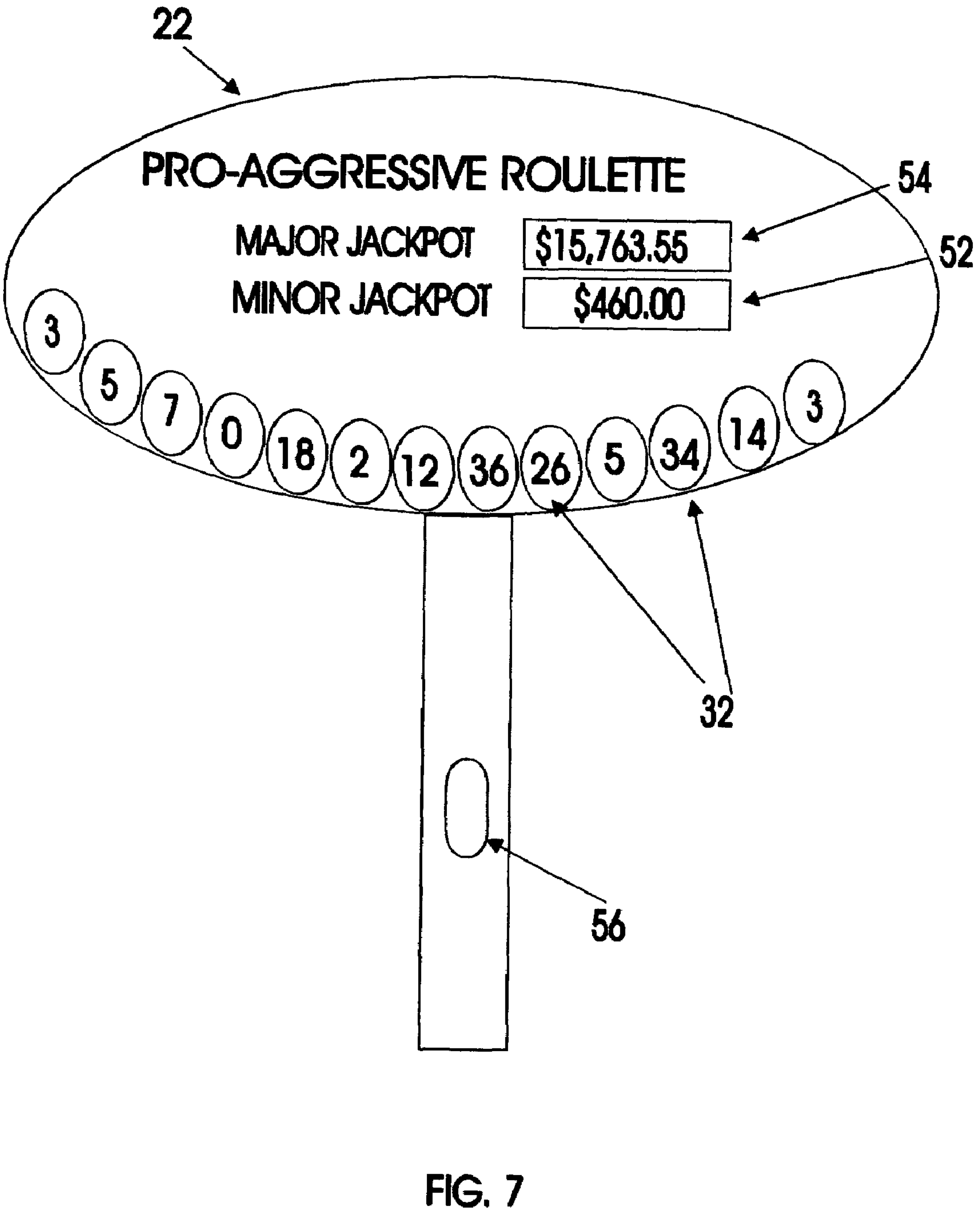
FIG. 7 is a front view of the sign displaying the major and minor Pro-Aggressive Jackpots and segmented display.
Figure 8:
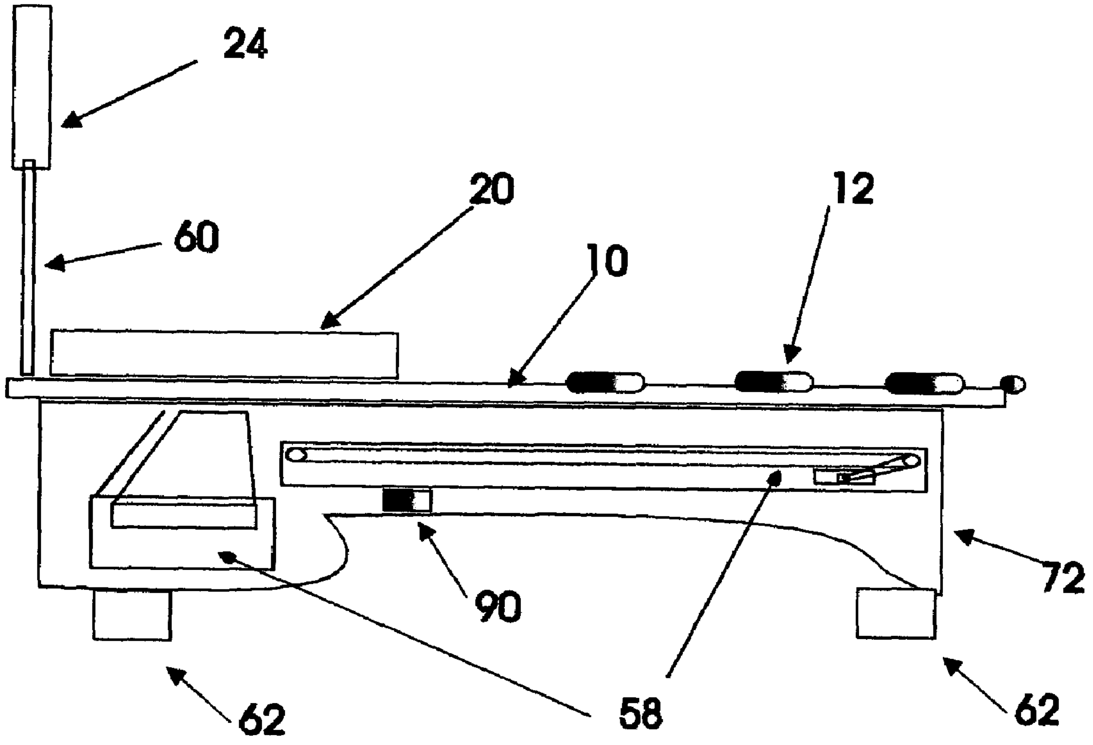
FIG. 8 is a side cut-a-way view showing the placement of the conveyor system used to return the chips or tokens back to the dealer and micro controller, structure and legs.
Figure 9:
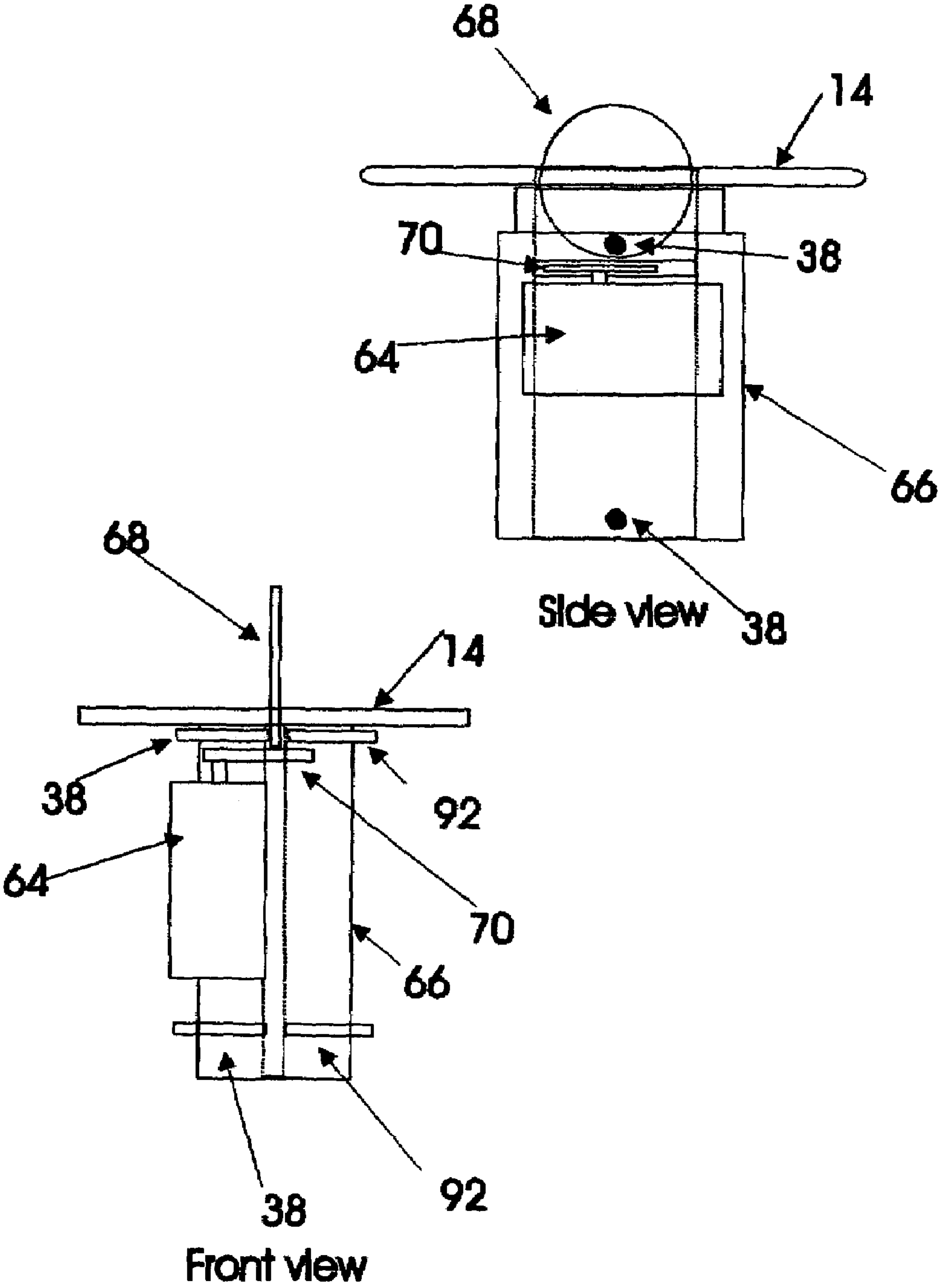
FIG. 9 is a side view of the coin gate depicting the servomotor attached to the side and light emitting diodes and infrared phototransistors.

To win the major pro-aggressive jackpot, the course of play would be the same for the dealer and the player except the first number would have to be 2 than 0 or 00 or any one of the three number combinations. As long as the three numbers are 0, 2, and 00 or 00, 0 and 2 that configuration is a major pro-aggressive jackpot winner. See FIG. 3. 30. For the European or French layout the numbers would be 1, 0 and 3 or any of the three number combinations as depicted in FIG. 4. 30.

Figure 10:
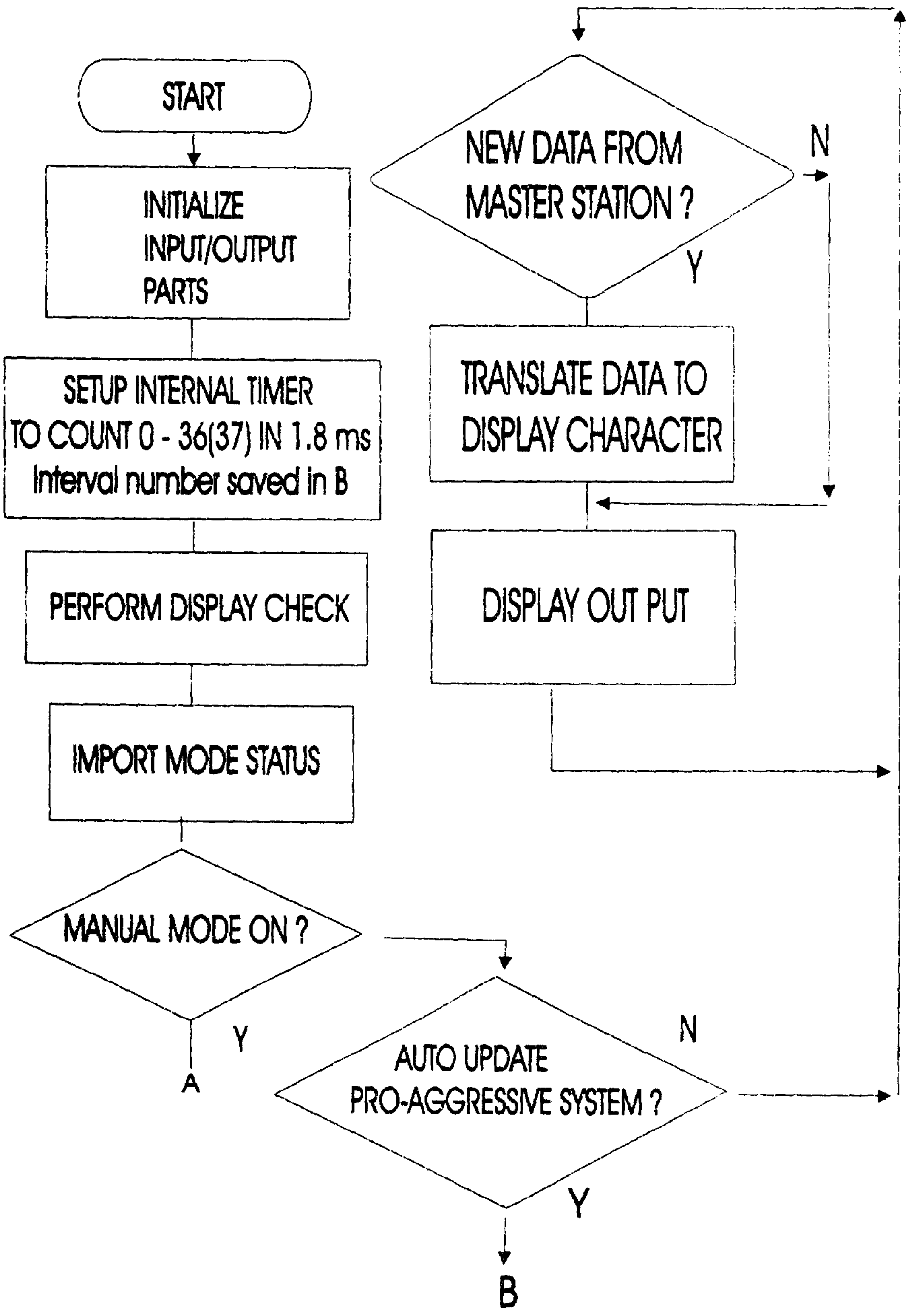
FIGS. 10, 10A and 10B is the sign/electronic wheel flow chart illustrating the electrical signals.
Figure 10A:
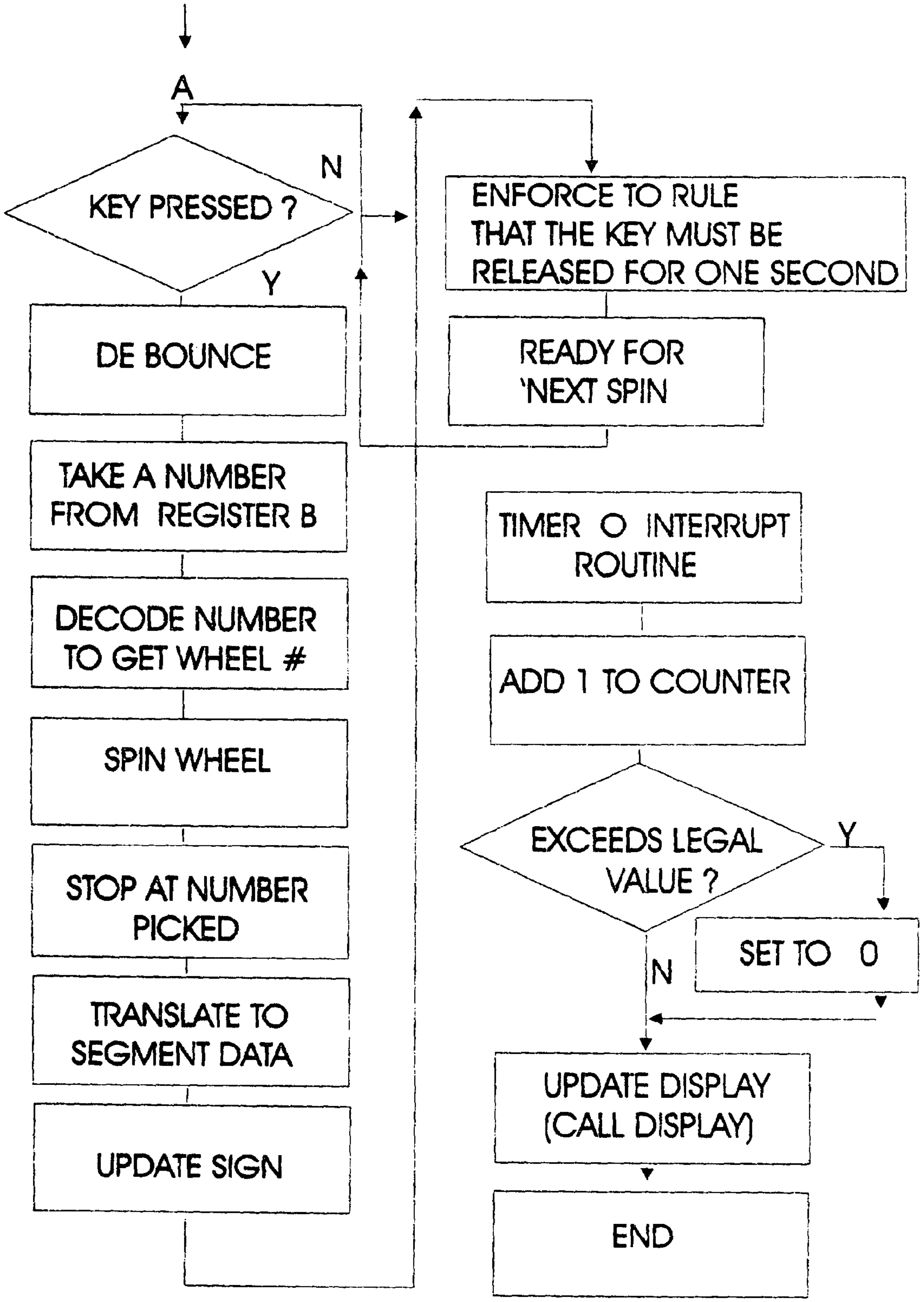
Figure 10B:
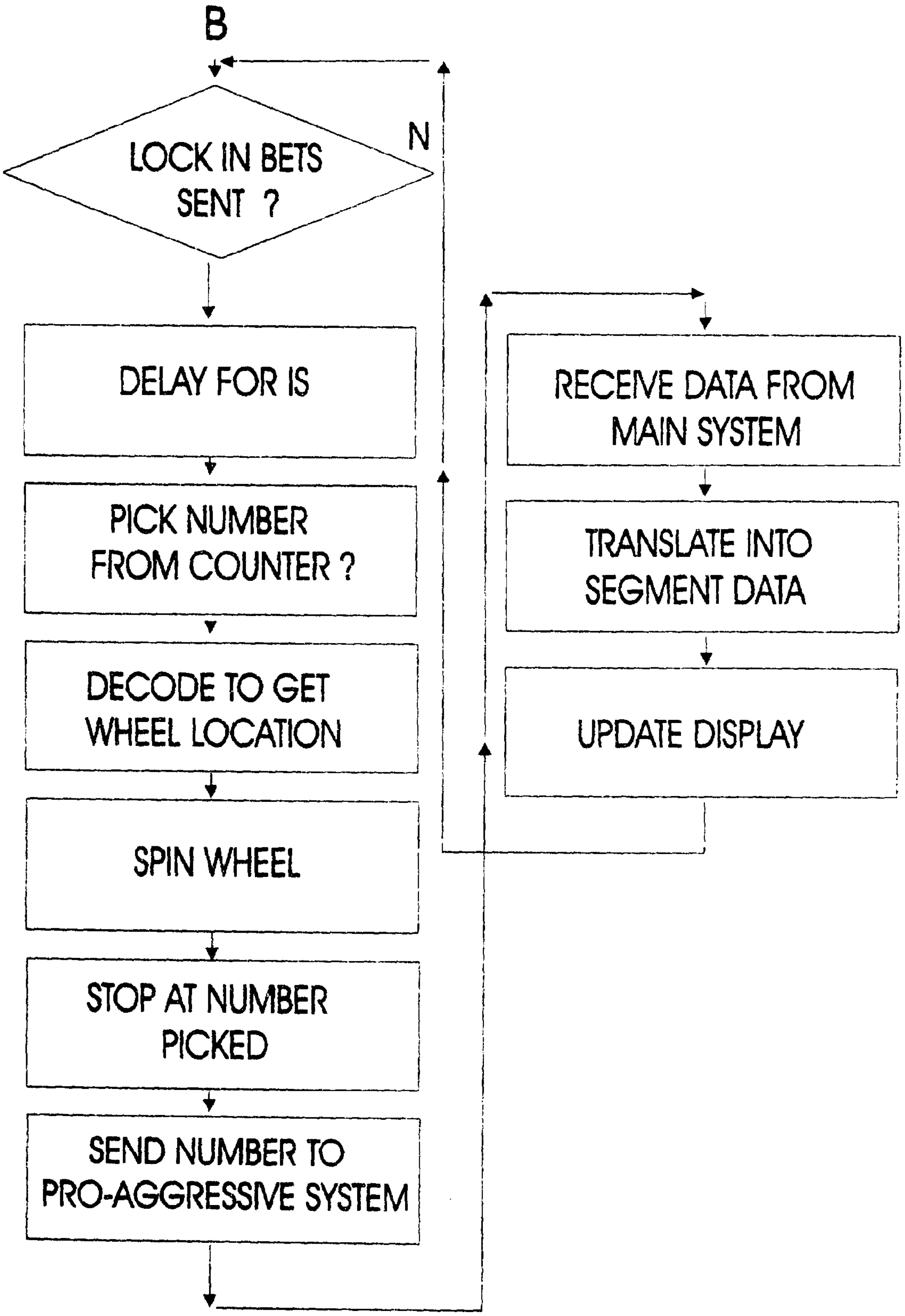
Figure 11:
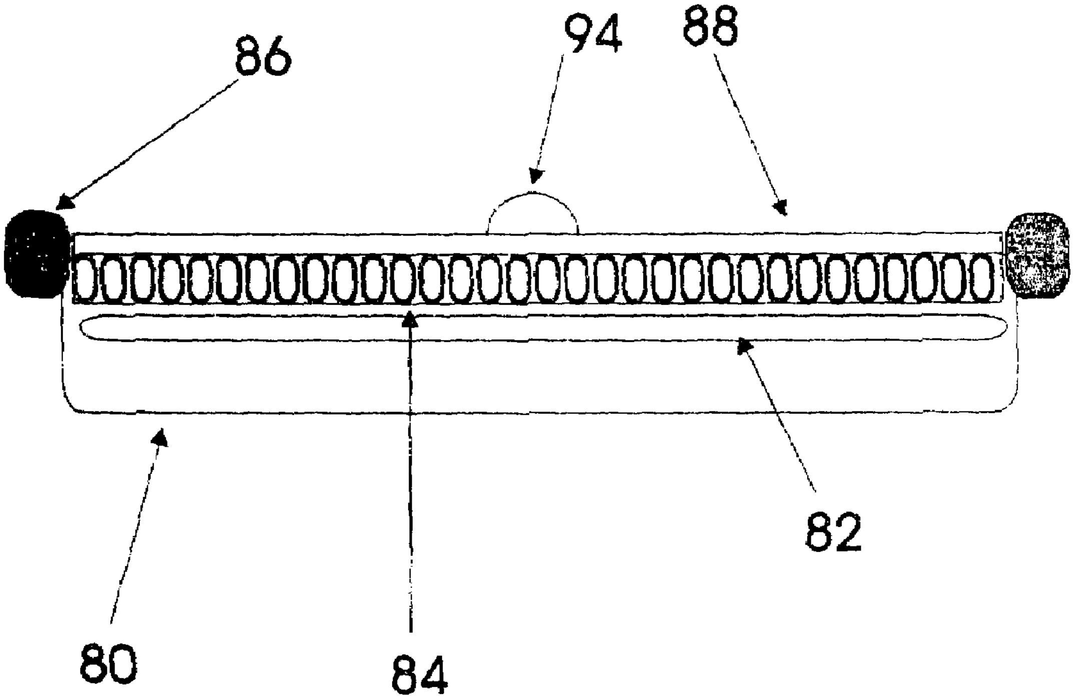
FIG. 11 is a side view of the electronic roulette wheel depicting the LED lights under the indicia face of the wheel.
Figure 12:
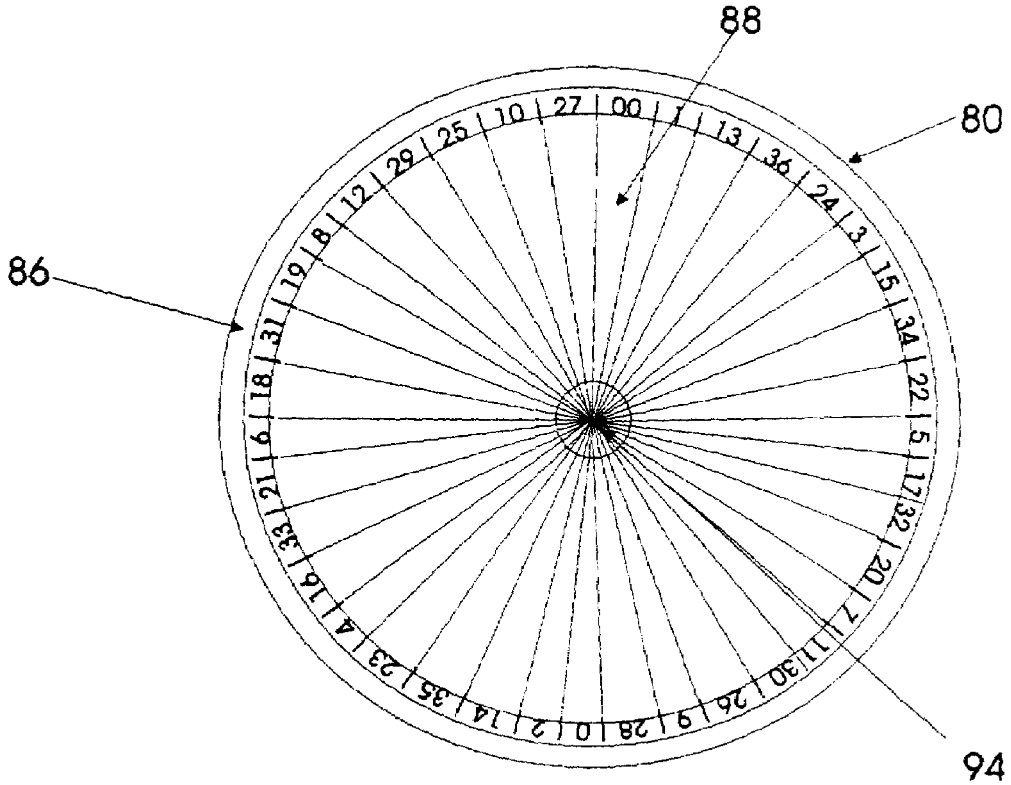
FIG. 12 is the top view of the electronic roulette wheel depicting the indicia face of the roulette wheel, finial, rim and numbers and boundaries.
Figure 14:
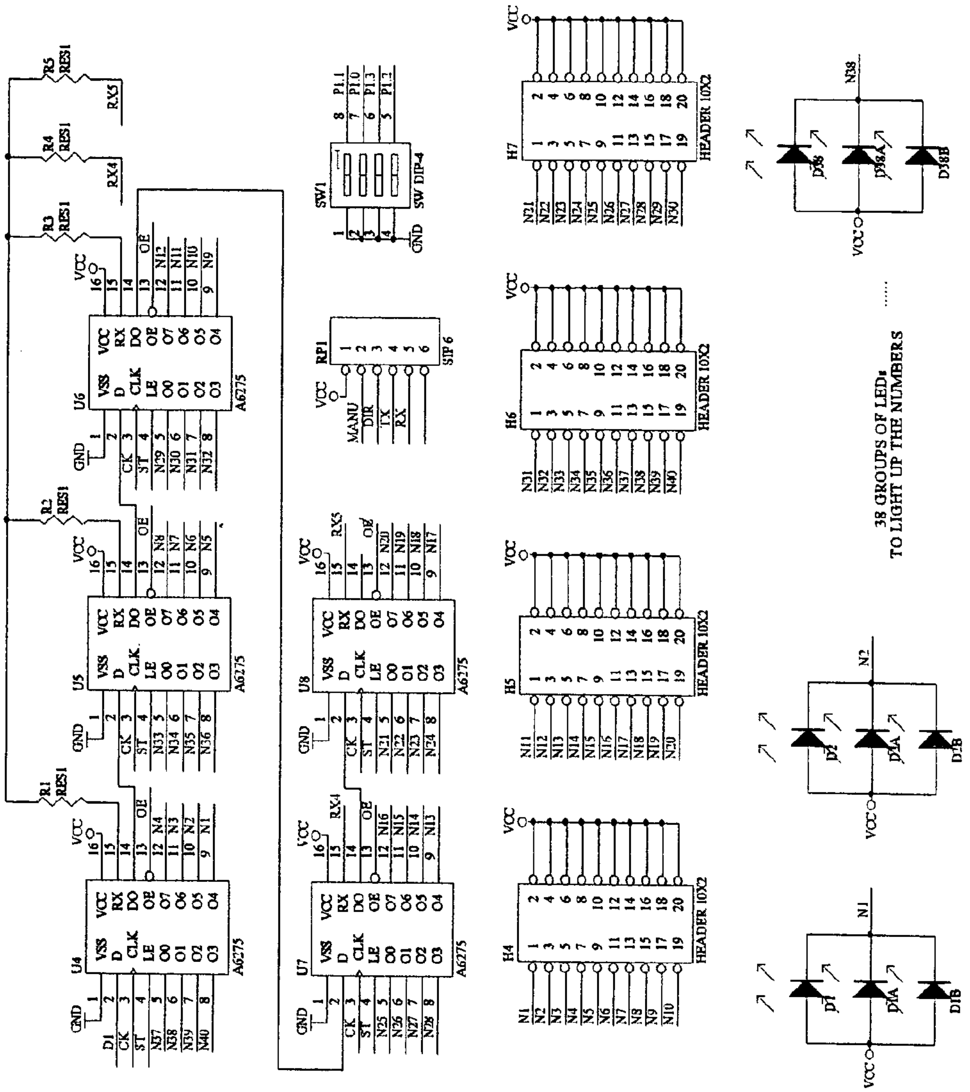
FIGS. 14, 14A, 14B, 14C, 14D, 14E, 14F and 14G is a block diagram of the present invention and circuitry and circuits used in conjunction with the invention.
Figure 14A:
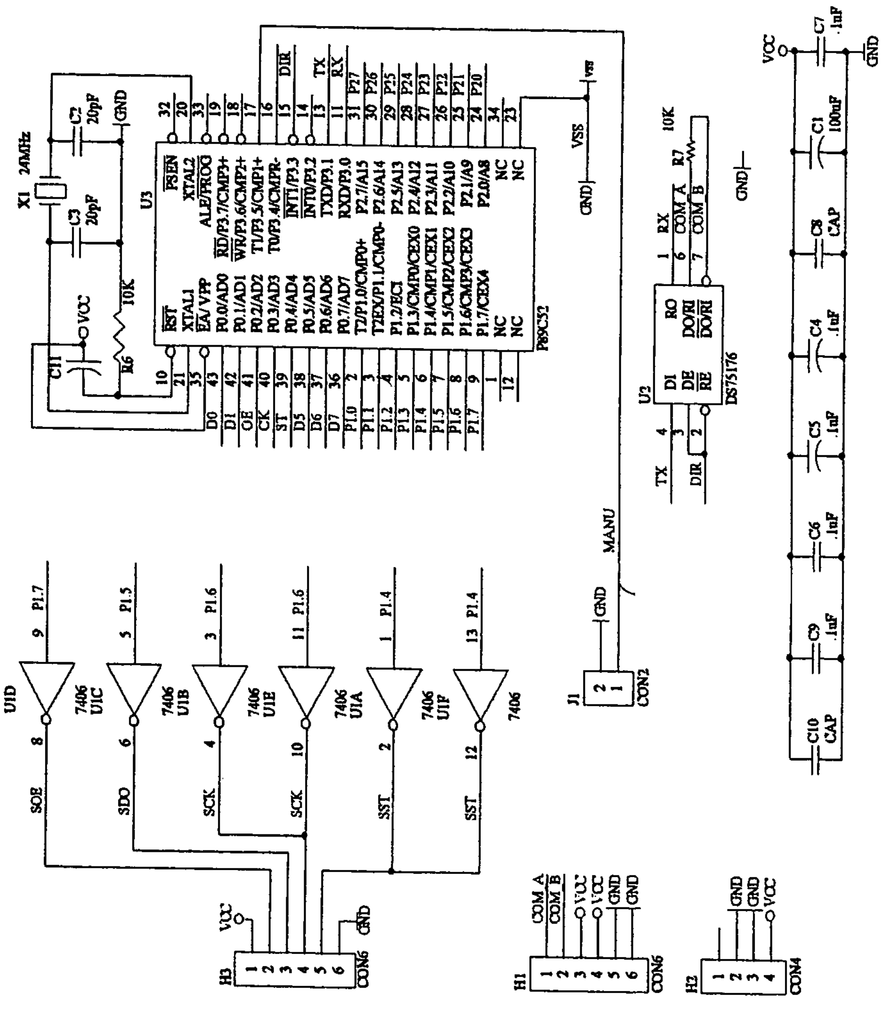
Figure 14B:
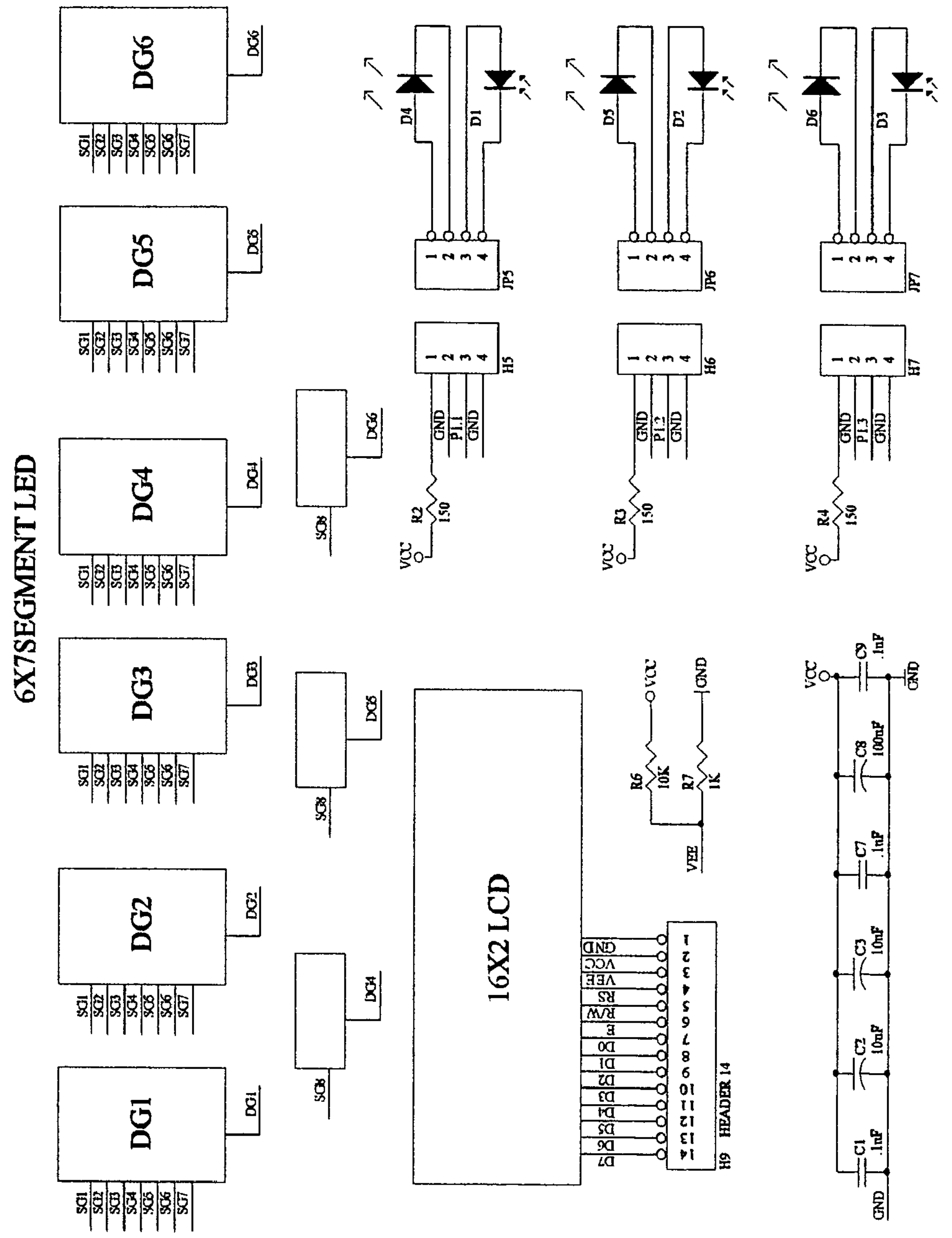
Figure 14C:
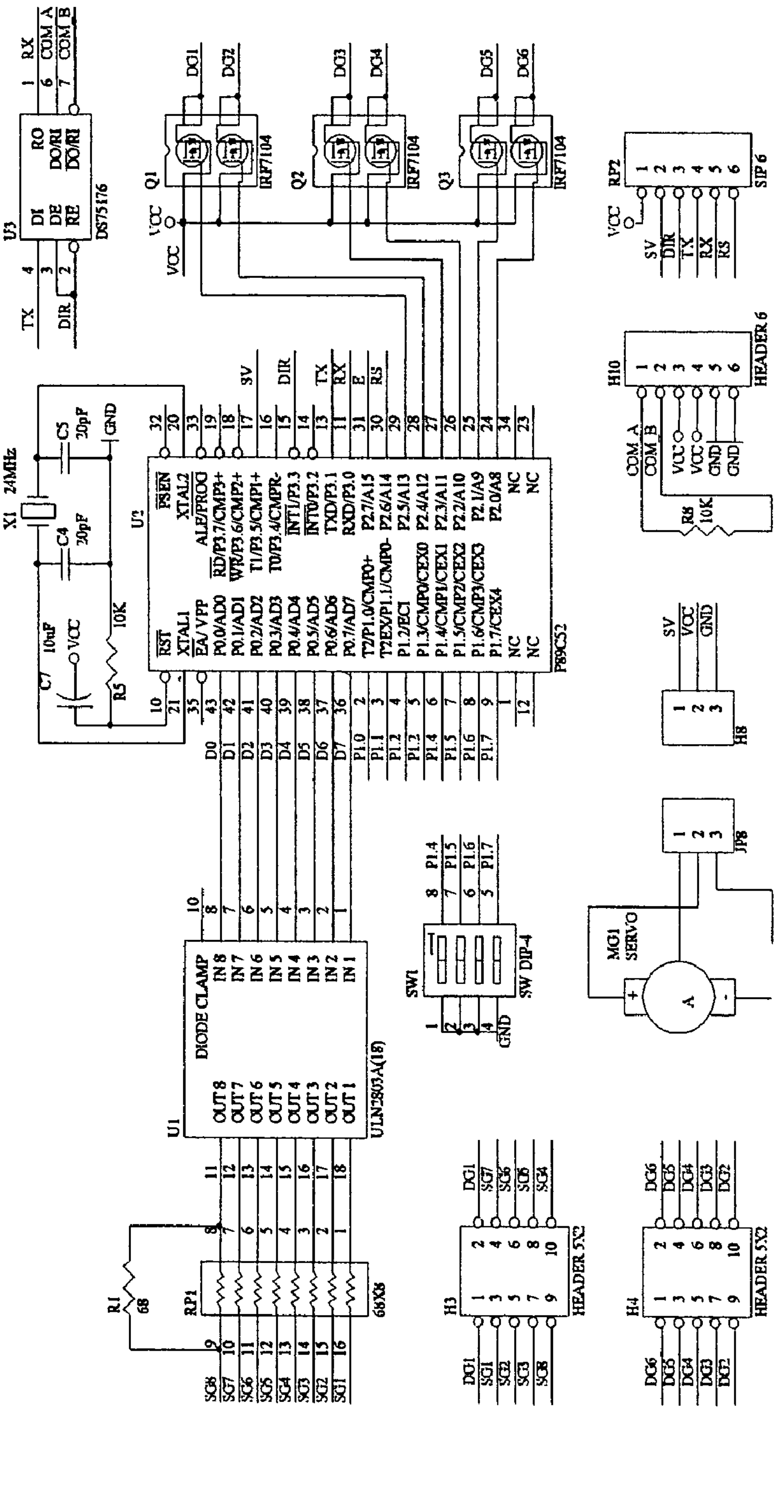
Figure 14D:
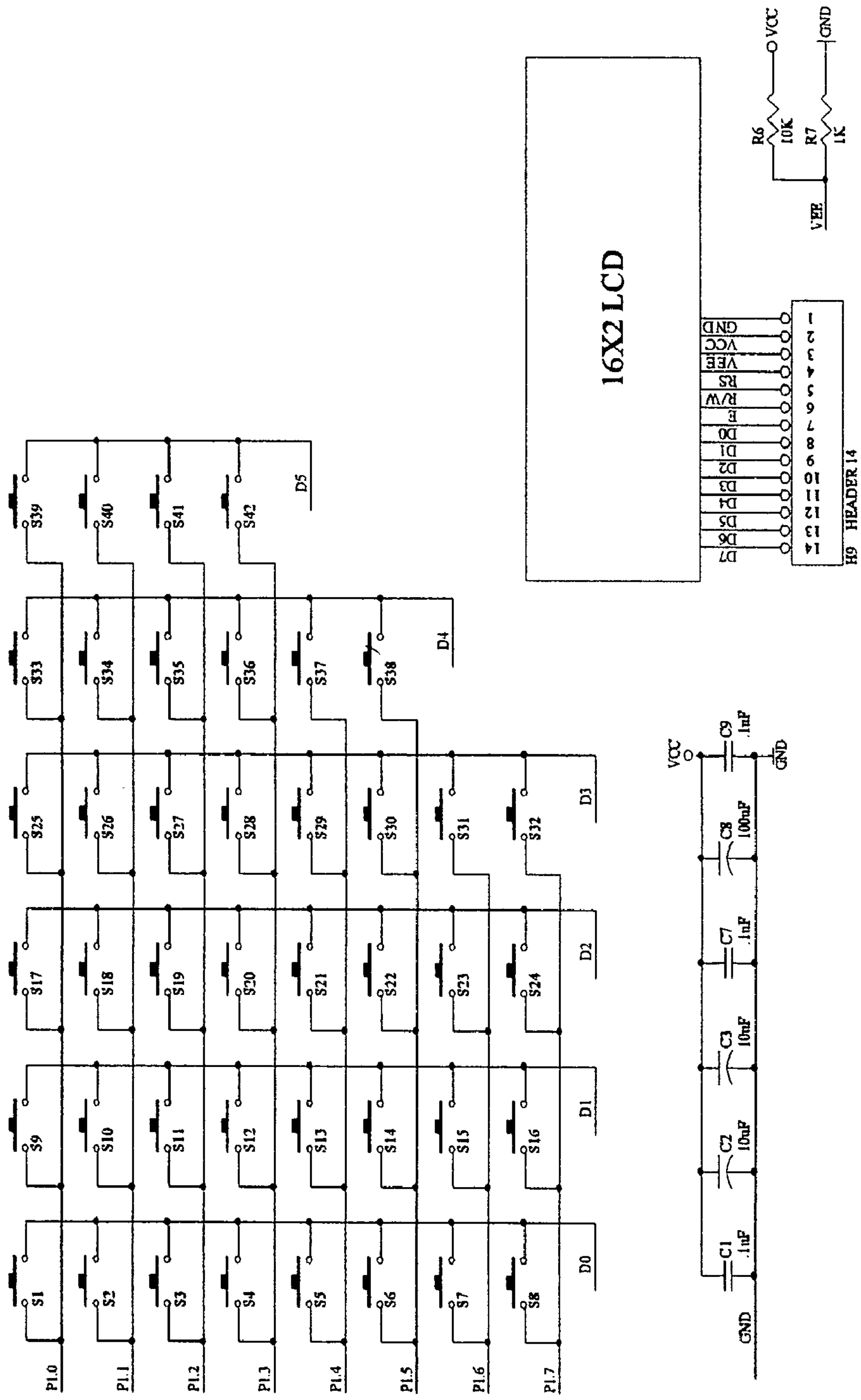
Figure 14E:
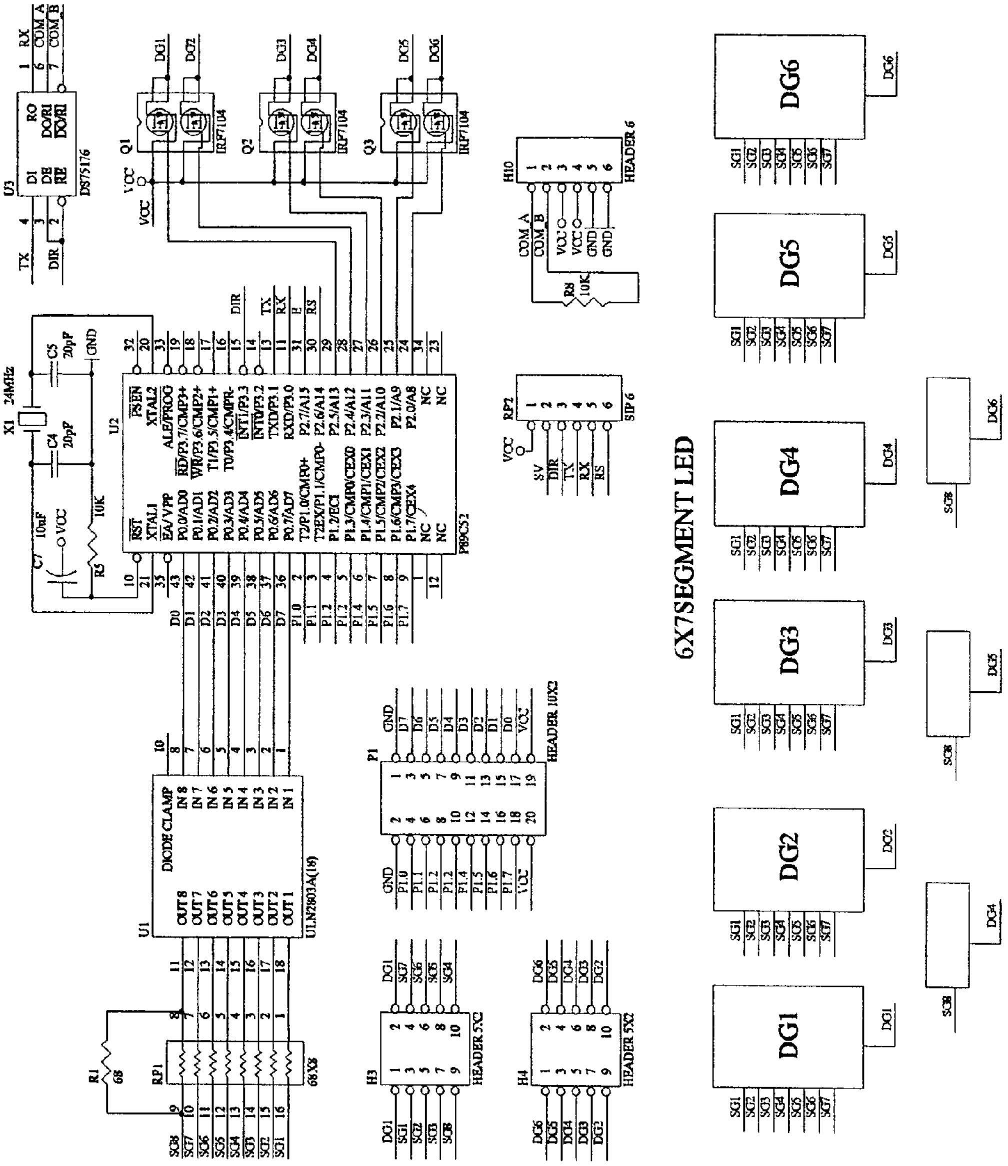
Figure 14F:
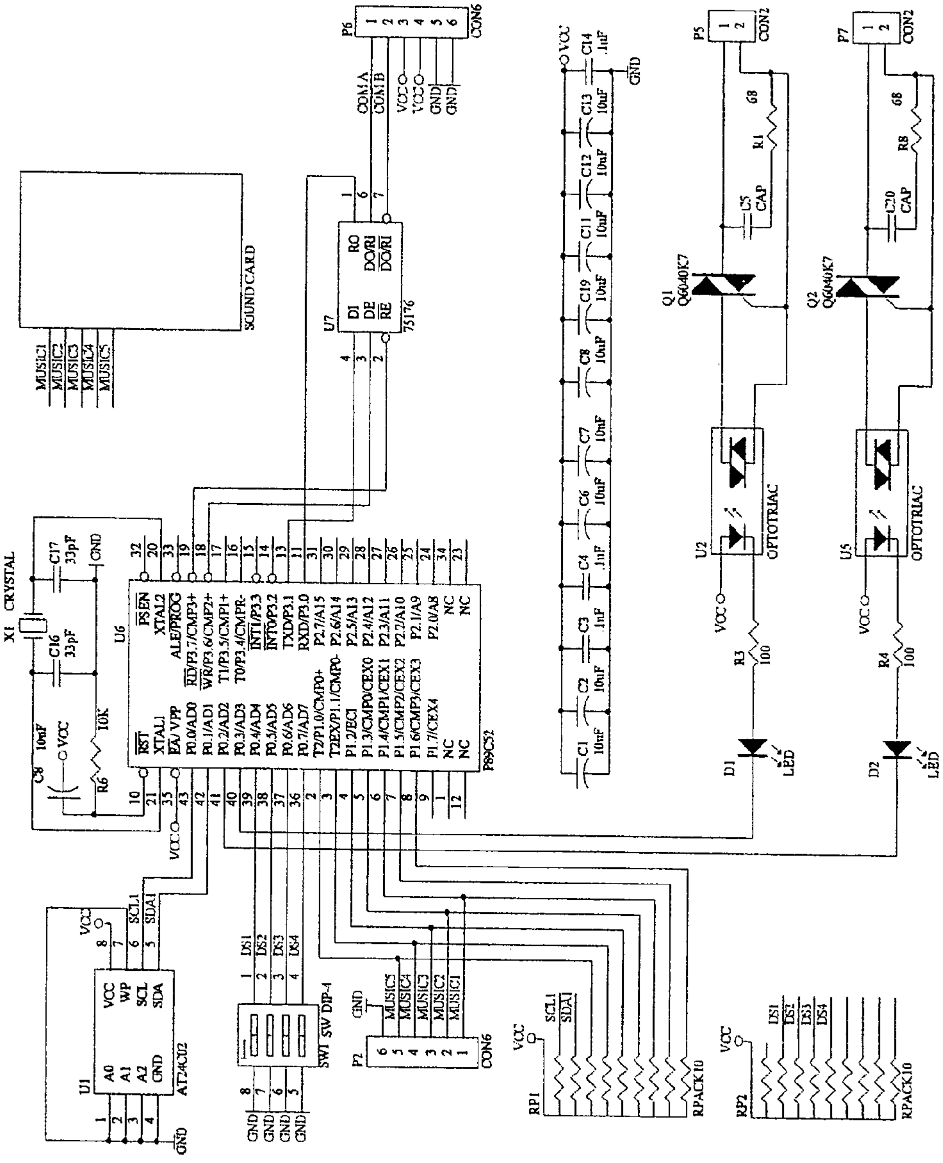
Figure 14G:
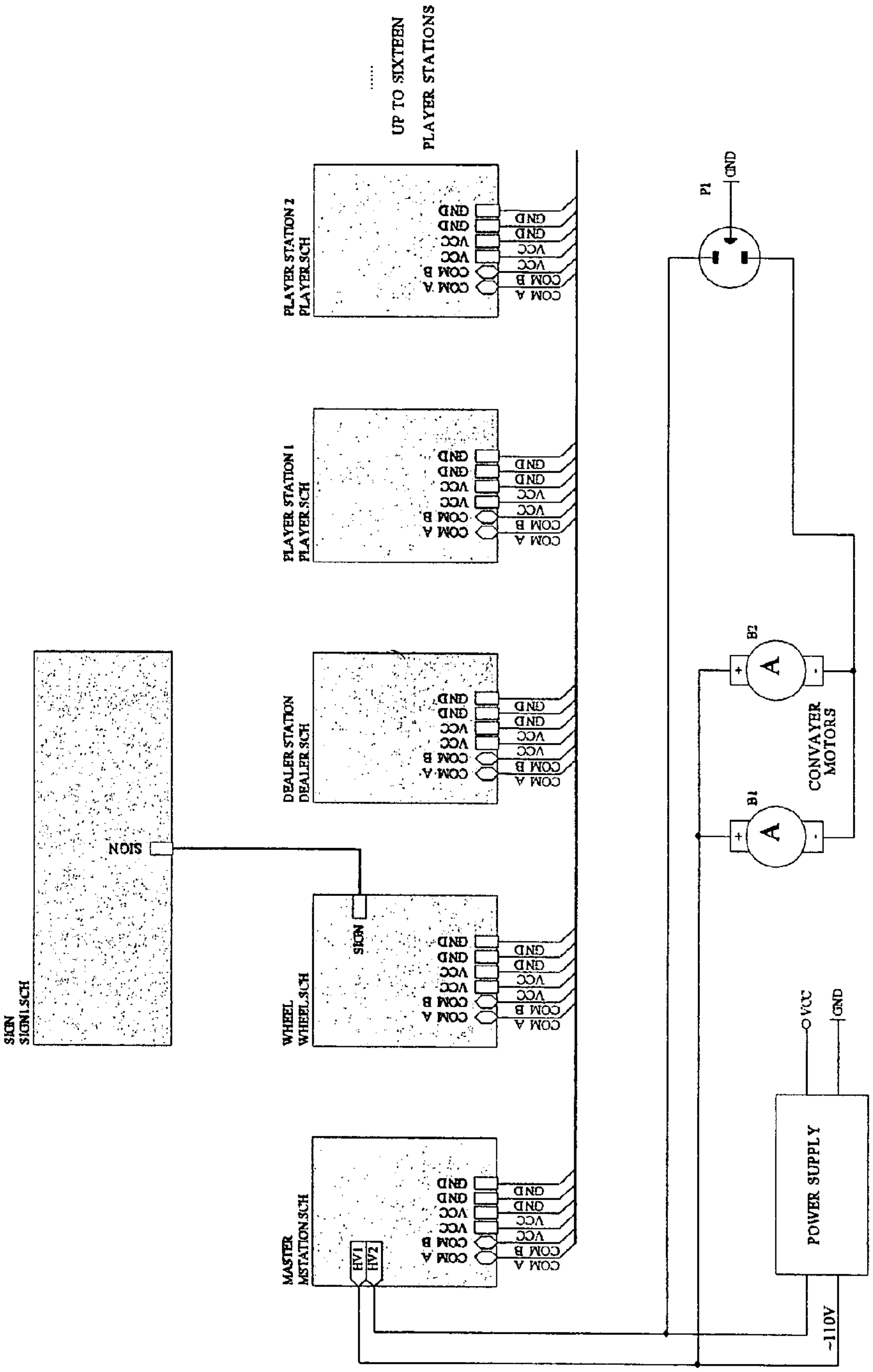

No matter what time during the course of play, and a new player sits to participate in the game of roulette, and they insert a token or wager in the coin gate acceptor slot 36, the nest number that comes up, that is their first number for their next three in a row or three consecutive numbers in a line. If for example the dealer makes a mistake and manually inserts the wrong number in the key pad 40 he simply presses the cancel button 48 and re-enters the correct number again on the key pad. If the player for example, inserts an incorrect amount of the chip or token wagered in the slot 36, the dealer need only press the chips button 46 and all the tokens dropped or accepted at that interval will return to the dealer to be verified and than the dealer can return the token or chip back to the player. The chips button 46 can also be used to clear out the hoppers when the house wants to close the game down. The function key switch 42 is used in conjunction with the key pad 40 by management for correcting and canceling mistakes made by the dealer entering the wrong number. The key switch 42 and LCD screen 34, on the dealers control panel 16 is used during management mode to correct mistakes and use for other functions as depicted in FIG. 13. The sign 22 is configured to receive all data from the dealers control panel 16 via the micro controller 90. The sign displays the major pro-aggressive jackpot 54 and the minor pro-aggressive jackpot 52. It also displays the last twelve numbers 32 in a segmented display string or chain from the dealer inputting the numbers with the key pad 40 as the wheel was spun. If the electronic wheel 80 is used, it is done automatically. The speaker 56 is located on the pole 60 attaching the sign to the table base structure 72. The speaker 56 plays a musical tune that is pre programmed into the micro controller 90 when either one of the jackpots are hit. The musical tune is different for each type jackpot. The music not only excites the action, it alerts management that a jackpot was hit so they may verify the payouts to the players. To play the roulette game using the electronic wheel 80, the dealer need only press the accept bets button 44 on the control panel 16 to start the spin for the action. The electronic wheel head 80 can operate the game with out the player or players inserting a token or wager in the coin slot acceptor also. The micro controller 90 is designed to pick a random number between 1 and 36, 0 and 00 respectfully to achieve the same desired effect of the manual wheel. By flipping a dipswitch in the micro controller 90 in the pro-aggressive roulette table, the table will reset in the European fashion using only the single zero and the Electronic wheel 80 will only seek the numbers 1 thru 36 and 0 as depicted in FIG. 4. The game can continue as a regular roulette game regardless. When the player inserts a wager in the coin gate slot 36, and the dealer presses the accept button 44 on the dealer control panel 16 the pro-aggressive game accepts the wager and the micro controller using the time generated number portion is looking for the number to display the result on the wheel 80 and on the sign 32 at the same time as depicted in FIG. 10*a*. Mounted under the opaque plastic membrane 88 and inside the electronic wheel head 80 is an array of LED lights 84 mounted on a round disk 82 FIG. 11 and indexed in a fashion to light the indicia above on the plastic membrane 88. The rim is set to protect the plastic membrane 88 from either tampering or scratching. The finial 94 is set in the center just to give the wheel some depth, looks and resemblance of a manual wheel.

What is claimed is:

1. A method for playing and wagering a live roulette game using a standard roulette wheel and standard roulette table layout having thereon a plurality of numbers corresponding to an identical numbered indicia group on a roulette wheel which further having an additional position for wagering and receiving a pro-aggressive jackpot betting, the method comprising the steps of (a) placing a wager by each player on the surface of a live roulette game table to participate in the pro-aggressive jackpot portion of roulette;

(b) inserting a first token or chip in a coin gate acceptor to receive a first number of three in a line or three row to win a pro-aggressive jackpot;

(c) inserting a second token or chip in a coin gate acceptor to receive the second number of three in a line or three row to win a pro-aggressive jackpot (d) inserting a third token or chip in a coin gate acceptor to receive the third number of three in a line or three in a row sequentially to win a pro-aggressive jackpot;

(e) accumulating a pro-aggressive jackpot account fund from a portion of said wagers;

(f) receiving and displaying wagering information via a player station wherein the player station having a coin gate acceptor, three segmented displays, LCD screen display or video screen display, (g) manually entering numbers from a control panel, wherein the control panel consisting of a numbered key pad corresponding to the indicia of the table layout and an enter button for sending entered identical number to the segmented displays, LCD display or video display attached to the table surface located at the wheel located at the end of the table; and (h) calculating wagering information by said player station, which adds an amount of percentage wagered to two separate pro-aggressive jackpots.

2. The method of claim 1, wherein a plurality of LED lights are affixed underneath an electronic roulette wheel like head comprised of opaque plastic membrane displaying a fixed number indicia or light display that corresponds with a number indicia of the roulette table layout the method further comprising:

(i) using a start button located at the main control panel for activating a timed counting cycle to visually spin and display a random number associated with the indicia of a numbered live roulette layout;

(j) detecting a winning three number combination and calculating a pay out of an accumulated amount of a jackpot condition and recycling to a predetermined amount; and (k) pre-setting the jackpot amount or the accumulated jackpot amount.

3. The method of claim 1 further comprising:

using a conveyor system to receive and recycle the coin accepted or token accepted drop from the wagering positions back to the dealer position for continuous play by a pre-programed automatic function token return.

4. The method according to claim 1 further comprising:

providing two pro-aggressive jackpots that can only be won by placing a wager three times in a row consecutively; and catching three spins in a row of numbers touching each other or catching three spins in a row of numbers touching each other either horizontally, vertically or diagonally or 2, 0, and 00.

5. The method according to claim 1 further comprising:

providing a major pro-aggressive jackpot for the double 00 roulette wheel that can only be won by catching the numbers 0, 2, and 00 only in any fashion consecutively.

6. The method according to claim 1 further comprising:

providing a major pro-aggressive jackpot for the single 0 roulette wheel that can only be won by catching the numbers 1, 3, and 0 only in any fashion consecutively.

* * * * *